United States Patent [19]

Lipp et al.

[11] 4,252,691

[45] Feb. 24, 1981

[54] NEUTRON ABSORBER BASED ON BORON CARBIDE AND CARBON AND A PROCESS FOR THEIR PRODUCTION

[75] Inventors: Alfred Lipp, Bad Worishofen; Klaus Reinmuth, Durach; Detlef von Struensee, St. Mang, all of Fed. Rep. of Germany

[73] Assignee: Elektroschmelzwerk Kempten GmbH, Munich, Fed. Rep. of Germany

[21] Appl. No.: 960,777

[22] Filed: Nov. 15, 1978

[30] Foreign Application Priority Data

Nov. 22, 1977 [DE] Fed. Rep. of Germany ....... 2752040

[51] Int. Cl.$^3$ .......................... G21F 1/06; C04B 35/68

[52] U.S. Cl. ...................................... 252/478; 106/43; 106/56; 176/DIG. 2; 250/517; 250/518; 250/519; 264/29.1

[58] Field of Search ................ 252/478; 250/517, 518, 250/519; 264/29.1; 106/43, 56; 176/DIG. 2

[56] References Cited

U.S. PATENT DOCUMENTS

| | | | |
|---|---|---|---|
| 3,133,887 | 5/1964 | Alliegro et al. | 252/478 |
| 3,153,636 | 10/1964 | Shanta et al. | 252/478 |
| 3,810,963 | 5/1974 | Benton et al. | 264/29.1 |
| 3,969,124 | 7/1976 | Stewart | 264/29.1 |
| 4,156,147 | 5/1979 | Naum et al. | 250/518 |

FOREIGN PATENT DOCUMENTS

| | | | |
|---|---|---|---|
| 625555 | 8/1961 | Canada | 250/518 |

*Primary Examiner*—Deborah L. Kyle

*Attorney, Agent, or Firm*—Burgess, Ryan and Wayne

[57] ABSTRACT

The subject of the invention is thin large-area neutron-absorber plates having a volume composition of from 40 to 60% and preferably from 45 to 60% by volume of boron carbide, from 25 to 5% by volume and preferably 15 to 5% by volume of free carbon, the remainder being pores, a density of from 1.4 to 1.8 g/cm$^3$, a flexural strength at room temperature of from 15 to 45 N/mm$^2$, a compressive strength at room temperature of from 25 to 60 N/mm$^2$, a modulus of elasticity at room temperature of from 10,000 to 20,000 N/mm$^2$, and a resistance to ionizing radiation of at least $10^{11}$ rad, which plates may be produced by mixing boron carbide powder, containing at least 75% by weight of boron and a proportion of boron oxide of less than 0.5% by weight, and having a particle size distribution of at least 95% finer than 50 μm and, optionally, graphite powder with a pulverulent organic resin binder and a wetting agent, shaping the mixture under pressure at room temperature, curing the resin binder at temperatures of up to 180° C., and then coking the shaped plates with the exclusion of air at temperatures of up to approximately 1000° C. with a controlled temperature increase.

11 Claims, No Drawings

NEUTRON ABSORBER BASED ON BORON CARBIDE AND CARBON AND A PROCESS FOR THEIR PRODUCTION

The present invention relates to a neutron absorber material comprising boron carbide, suitable for use as a neutron shield in nuclear reactors, and to a process for its manufacture.

Boron is known to be a good absorber of neutrons and various boron-containing neutron-absorber materials have previously been described.

Neutron-shield blocks prepared by intimately incorporating a finely divided boron compound (preferably borax) in a graphite mix which preferably contains a carbonizable binder (preferably tar or pitch), and subsequently heating the mixture to a temperature (preferably about 1000° C.) high enough to carbonize the binder and melt the boron compound but not so high as to decompose or volatilize the boron compound, are described in British Patent Specification 797,692. The boron content of these blocks is said to be preferably from 0.25 to 10% by weight. These neutron-shield blocks do not have a high fire-resistance, nor do they have a high resistance to oxidation. Moreover, they have only a low flexural strength.

The manufacture of a heat-resistant boron-containing material by heating a boron-containing component (for example boron carbide). a carbon-containing component (for example graphite or coke powder) and, optionally, a carbon-containing binder, to a temperature of at least 1800° C. under a pressure of at least 1.758 kg/mm$^2$ (about 175 MPa), provided that the substances added to the carbon-containing material melt under the conditions used, is described in DE-PS No. 1,302,877. It is apparent from this specification that the manufacture of high-strength and high-density materials containing boron and carbon has generally required the use of high temperatures and high pressures. The material described in British Patent Specification No. 797,692 is manufactured by pressureless heat treatment at a temperature of only about 1000° C. and does not have a high strength.

This view is confirmed by U.S. Pat. No. 3,153,636, which describes the manufacture of various porous materials, including a neutron-shield material having a minimum boron content of 0.54 g/cm$^3$, an average density of from 0.71 to 0.85 g/cm$^3$, and an average compressive strength (or pressure resistance) of 5.62 N/mm$^2$ (800 p.s.i.). This material is manufactured by mixing a pulverulent epoxy-modified phenolic resin and a phenol/formaldehyde resin in the form of hollow thin-walled spheres with pulverulent boron carbide, curing the mixture after having been transferred to a mould with vibration at a temperature of from 140° to 160° C., and subsequently firing it in an inert atmosphere at a temperature of about 950° C. Higher-density materials (from 1.5 to 2 g/cm$^3$) can be obtained only if graphite is used in such large amounts (from 80 to 90% by weight) that the product is a borated graphite (cf. U.S. Pat. No. 3,231,521), and it is then necessary to use pressures of about 70 MPa (about 10,000 p.s.i.) when moulding the material, and temperatures of about 600° C. when baking it.

It is thus apparent from the prior art that only porous ceramic materials could be obtained from mixtures of pulverulent boron carbide, phenolic resin binders and graphite (if the graphite was not present in large quantities) when curing the mixture after moulding, and subsequently firing it in an inert atmosphere at a temperature of not more than 1000° C. An approximately uniform distribution of the pores could be achieved by using part of the binder in the form of hollow thin-walled spheres. Such materials have a low density combined with mediocre strength properties.

Although a process for the manufacture of a high-density material comprising boron carbide and a phenolic resin binder is described in French Pat. No. 1,568,883, this process requires the application of pressure of from 1 to 4 t/cm$^2$ (about 100 to 400 MPa) during moulding and prior to curing and coking. The application of a pressure of this magnitude is not practicable when manufacturing thin large-area plates.

Highly densified materials containing a relatively large proportion of boron carbide (from 50 to 60% by volume) can be manufactured by a hot-pressing process, but such processes are limited as regards the shape in which the material may be formed and the production of thin large-area plates by this method is very difficult.

Thin large-area plates of neutron-absorber material have sometimes to be manufactured by sawing blocks of such material.

The present invention provides a neutron-absorber material having

- a composition of from 40 to 60%, preferably 45 to 60%, by volume of boron carbide and from 5 to 25%, preferably 5 to 15% by volume of free carbon, the remainder being pores;
- a density within the range of from 1.4 to 1.8 g/cm$^3$; a flexural strength at room temperature within the range of from 15 to 45 N/mm$^2$;
- a compressive strength at room temperature within the range of from 25 to 60 N/mm$^2$; a modulus of elasticity at room temperature within the range of from 10,000 to 20,000 N/mm$^2$; and a resistance to ionizing radiation of at least $10^{11}$ rad.

The present invention also provides a process for the manufacture of a neutron-absorber material which comprises:

(i) forming a mixture of boron carbide containing at least 75% by weight of boron and not more than 0.5% by weight of boron oxide and having a particle size distribution (by weight of)
at least 95% finer than 50 μm,
at least 90% finer than 30 μm,
at least 70% finer than 20 μm,
at least 50% finer than 10 μm,
at least 30% finer than 5 μm, and
at least 10% finer than 2 μm,
with an organic resin binder, a wetting agent and, optionally, pulverulent graphite;

(ii) shaping the mixture under pressure within the range of from 25 to 30 MPa at room temperature;

(iii) curing the mixture at a temperature of not more than 180° C.; and subsequently, (iv) coking the mixture in the absence of air at a temperature of up to 1000° C. with a controlled temperature increase of not more than 120° C./hour.

The neutron-absorber material of the invention and manufactured according to the process of the invention has the advantage that it can be manufactured in the form of thin large-area plates.

The neutron-absorber material of the invention consists almost exclusively of boron and carbon, with a volume density of from 40 to 60% and preferably from 45 to 60% by volume of boron carbide and from 5 to 25% and preferably from 5 to 15% by volume of free carbon, the remainder being pores. This composition corresponds to about 60 to 93% by weight, preferably about 70 to 93% by weight boron carbide, and about 40 to 7% by weight, preferably about 30 to 7% by weight free carbon.

The boron carbide portion of the material results from the pulverulent boron carbide used in the manufacture of the material, the purity and particle size distribution of the boron carbide being important in order to produce material having the desired properties. The term "free carbon" means carbon that is not chemically bonded in the boron carbide, and this carbon results from the organic resin binder, which decomposes to form amorphous carbon during coking, and from the graphite, if any is used.

The pulverulent boron carbide used in the manufacture of the neutron-absorber material according to the invention advantageously has a purity of at least 98% by weight (by which is meant that the sum of the boron content and the carbon content should total at least 98% by weight). This corresponds to a boron content of from 75 to 79% by weight. Boron carbide generally contains boron oxide as an impurity resulting from its manufacture, but the boron carbide used according to the invention must not contain more than 0.5% by weight of carbon oxide. Metallic impurities, especially iron and calcium, may also be present in minor amounts, but the amount of such impurities should advantageously not exceed 0.5% by weight each. Flourine and chlorine should advantageously not be present in amounts exceeding 100 ppm by weight each.

The boron carbide should advantageously have at least 96%, preferably at least 98%, and especially 100%, by weight of particles finer than 50 μm. A preferred particle size distribution is:

| | |
|---|---|
| | 100% finer than 50 μm, |
| at least | 99% finer than 30 μm, |
| at least | 97% finer than 20 μm, |
| at least | 90% finer than 10 μm, |
| at least | 75% finer than 5 μm, and |
| at least | 50% finer than 2 μm. |

The organic resin binder used is advantageously one that is pulverulent and especially, pulverulent at room temperature. It is preferably a phenolic resin, especially a phenol/formaldehyde condensation product of the novolak or resole type, which will decompose at a temperature of not more than 1000° C. to form amorphous carbon in a yield of from 35 to 50%. The resin should advantageously be substantially free of impurities, that is to say, that calcium, iron, sodium and potassium should be present in amounts not exceeding 20 ppm by weight each, magnesium in an amount not exceeding 5 ppm by weight, and copper in an amount not exceeding 1 ppm by weight.

The pulverulent graphite optionally used in the preparation of the mixture is advantageously natural graphite and advantageously has a particle size distribution of finer than 40 μm.

The boron carbide, organic resin and, optionally, graphite are mixed together in the proportions necessary to give the desired final composition, together with a wetting agent (for example furfural) to form a homogeneous flowable powder.

In order to obtain the desired end composition in the finished materials, the starting materials are used preferably in the following quantities:

50 to 85% by weight, preferably 60 to 85% by weight boron carbide powder, 25 to 0% by weight, preferably 15 to 0% by weight graphite powder, 20 to 12% by weight resin powder and 5 to 3% by weight wetting agent.

The powder thus obtained is then poured into a press mould and molded at room temperature, under a pressure within the range of from 25 to 30 MPa. When the neutron-absorber material according to the invention is to be manufactured in the shape of plates, a plate press mould is used, for example a hydraulic press with a press mould in the form of a steel box. The mixture is advantageously moulded into the shape of plates having a thickness within the range of from 5 to 10 mm.

The soft shaped mixture is then removed from the mould and cured at a temperature of not more than 180° C. If the mixture is in the shape of plates, the soft plates may be stacked between glass carrier plates for the curing.

Finally, the shaped cured mixture is coked in the absence of air at a temperature of up to 1000° C. in order to decompose the organic resin binder. If the mixture is in the shape of plates, these may be stacked between graphite carrier plates of approximately the same thickness for the coking operation. Coking has to be carried out with a controlled temperature increase, that means not more than 120° C./hour, although the actual temperature program (consisting of heating, dwelling and cooling) depends on the shape and size of the mixture. For example, when the mixture is in the shape of plates measuring about 230 mm×300 mm, a temperature difference within each plate of about 150° C. should advantageously not be exceeded; this can be ensured, for example, by heating a stack of such plates to 200° C. over 4.5 hours to 400° C. over 7 hours, to 600° C. over 9 hours, to 800° C. over 12 hours, to 900° C. over 15 hours and to 1000° C. over 19 hours (all periods being measured from the commencement of heating), then maintaining this temperature for 3 hours, and cooling the stack over a further 24 hours.

Stacking of the plates between carrier plates during curing and coking assists in preventing them from becoming warped. The linear shrinkage of the plates during coking is generally only about 1%.

When it has been cooled subsequent to the coking operation, the neutron-absorber material according to the invention is ready for use and does not need to be machined further, except, for example, in the case of plates, to remove the edges and trim them to size. The neutron-absorber material according to the invention can be manufactured in the desired shape, especially in the form of thin large-area plates, and therefore such plates do not have to be prepared by sawing blocks of material.

The material according to the invention has good neutron-absorbing properties and is suitable, inter alia, for use in the manufacture of storage tanks for burnt-out fuel elements from nuclear reactors in instances where the radiation resistance of the plates is of paramount importance. Thus, there is practically no change in the mechanical properties and particularly no change in the dimensions when there is exposure to the action of an ionizing radiation of at least $10^{11}$ rad that is, the outgassing rate or the quantity of gaseous material produced is extremely low and negligible in practice.

The following examples illustrate the manufacture and properties of neutron-absorber material according to the invention. All parts and percentages are calculated by weight, unless otherwise stated.

EXAMPLE 1

100 parts by weight boron carbide powder, 18 parts by weight phenolac resin powder, and 4.2 parts by weight furfural were processed into a molding compound. The boron carbide powder contained 76.5% by weight boron and 0.5% by weight $B_2O_3$, with a particle size distribution of 100% finer than 50 μm, 99% finer than 30 μm, 97% finer than 20 μm, 90% finer than 10 μm, 75% finer than 5 μm, 50% finer than 2 μm. The mixture was molded into plates of 5 mm thickness under a pressure of 30 MPa, after which the plates were cured at 180° C. for 15 hours. The plates were then coked under a protective nitrogen atmosphere with a linear heating rate of up to 1000° C., where the temperature was attained in 18 hours and was kept constant for 4 hours.

Properties of the plates thus obtained:
density: 1.71 g/cm$^3$
boron content: 64.3% by weight, corresponding to 56% by vol. boron carbide
total carbon content, 31.5% by weight, corresponding to 10% by vol. free carbon
flexural strength: 12 N/mm$^2$
compression strength: 55 N/mm$^2$
modulus of elasticity: 12000 N/mm$^2$
Radiation resistance $10^{11}$ rad (no measurable change in the flexural strength and the dimensions).

EXAMPLE 2

Mixing, pressing, curing and coking were carried out as described in Example 1.

Composition of the moulding compound: 95 parts by weight of boron carbide, 5 parts by weight of graphite, 18 parts by weight of phenolic resin, 4.5 parts by weight of furfural. The boron carbide used contained 75.6% of boron and 0.2% of $B_2O_3$. Particle size distribution:
96% finer than 50 μm,
92% finer than 30 μm,
80% finer than 20 μm,
60% finer than 10 μm,
30% finer than 5 μm, and
10% finer than 2 μm.

As graphite, there was used a screened natural graphite fraction finer than 40 microns.

Properties of the boron carbide plates produced therefrom:
density: 1.44 g/cm$^3$
boron content: 62.3% by weight, corresponding to 46% by volume of boron carbide;
total carbon content: 33.3% by weight, corresponding to 10% by volume of free carbon;
flexural strength: 16 N/mm$^2$;
compressive strength 36 N/mm$^2$;
modulus of elasticity 13,000 N/mm$^2$;
resistance to irradiation $10^{11}$ rad (no measurable changes in the dimensions and strength).

What is claimed is:

1. A neutron-absorber material having a volume composition of from 40 to 60% by volume of boron carbide and from 5 to 25% by volume of free carbon, the remainder being pores, said neutron-absorber material having the following properties:
a density of from 1.4 to 1.8 g/cm$^3$,
a flexural strength at room temperature of from 15 to 45 N/mm$^2$,
a compressive strength at room temperature of from 25 to 60 N/mm$^2$,
a modulus of elasticity at room temperature of from 10,000 to 20,000 N/mm$^2$, and
a resistance to ionizing radiation of at least $10^{11}$ rad.

2. A neutron-absorber material according to claim 1 in the form of thin large plates.

3. A process for the production of a neutron-absorber material of claim 1, which comprises forming a mixture containing from about 50 to 85% by weight of boron carbide powder containing at least 75% by weight of boron and a proportion of $B_2O_3$ of less then 0.5% by weight, and having a particle size distribution of
at least 95% finer than 50 μm
at least 90% finer than 30 μm
at least 70% finer than 20 μm
at least 50% finer than 10 μm
at least 30% finer than 5 μm
at least 10% finer than 2 μm,
up to about 25% by weight graphite powder, from about 12 to 20% by weight of an organic resin binder and about 3 to 5% by weight of a wetting agent; shaping the mixture under pressure at room temperature; curing the resin binder at temperatures of up to 180° C.; and then coking the shaped mixture with the exclusion of air at temperatures of up to approximately 1000° C., with a controlled temperature increase not exceeding 120° C./hour.

4. A process according to claim 3, wherein
50 to 85% by weight of boron carbide powder
25 to 0% by weight graphite with a particle size finer than 40 μm
20 to 12% by weight of a powdered phenolformaldehyde condensation product as a resin binder and
5 to 3% by weight of furfural as a wetting agent,
are mixed homogeneously, the powder mixture thus obtained is then molded into plates of about 5 to 10 mm thickness at room temperature and a pressure of 25 to 30 MPa, the plates thus formed are stacked between carrier plates of an inert material, heated to temperatures of up to 180° C. to harden the resin binder, then further heated up to about 1000° C. to cure the resin binder, with a temperature rise of not more than 120° C./hour and subsequently cooled over a period of about 24 hours.

5. A process according to claim 3, wherein graphite powder with a pulverulent organic resin and a wetting agent are included in the starting mixture.

6. A process according to claim 5, wherein the graphite powder is natural graphite having a particle size distribution finer than 40 μm.

7. A process according to claim 3, wherein the boron carbide has a particle size distribution in which 100% by weight of the particles are finer than 50 μm.

8. A process according to claim 7, wherein the boron carbide has a particle size distribution (by weight) of

| | |
|---|---|
| | 100% finer than 50 μm, |
| at least | 99% finer than 30 μm, |
| at least | 97% finer than 20 μm, |
| at least | 90% finer than 10 μm, |
| at least | 75% finer than 5 μm, and |
| at least | 50% finer than 2 μm. |

9. A process according to claim 3, wherein the organic resin is pulverulent at room temperature.

10. A process according to claim 9, wherein the resin is a phenolic resin.

11. A process according to claim 10, wherein the phenolic resin is a phenol formaldehyde resin selected from the group consisting of novalak resins, resole resins and mixtures thereof.

* * * * *

UNITED STATES PATENT AND TRADEMARK OFFICE

CERTIFICATE OF CORRECTION

PATENT NO. : 4,252,691

DATED : Feb. 24, 1981

INVENTOR(S) : Alfred Lipp, et al

It is certified that error appears in the above—identified patent and that said Letters Patent is hereby corrected as shown below:

Column 3, line 31: "Flourine" should read --Fluorine--.

Column 5, line 10: " phenolac " should read --phenolic--.

Column 6, line 45: "harden" should read --cure--.

line 46: "cure" should be --coke--.

Signed and Sealed this

*Fourth* Day of *August 1981*

[SEAL]

*Attest:*

GERALD J. MOSSINGHOFF

*Attesting Officer* *Commissioner of Patents and Trademarks*